(12) United States Patent
Baldemair et al.

(10) Patent No.: US 12,068,847 B2
(45) Date of Patent: Aug. 20, 2024

(54) CONTROL SIGNALING FOR RADIO ACCESS NETWORKS

(71) Applicant: Telefonaktiebolaget LM Ericsson (publ), Stockholm (SE)

(72) Inventors: Robert Baldemair, Solna (SE); Sorour Falahati, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 66 days.

(21) Appl. No.: 16/961,116

(22) PCT Filed: Jan. 12, 2018

(86) PCT No.: PCT/SE2018/050029
§ 371 (c)(1),
(2) Date: Jul. 9, 2020

(87) PCT Pub. No.: WO2019/139514
PCT Pub. Date: Jul. 18, 2019

(65) Prior Publication Data
US 2020/0374031 A1 Nov. 26, 2020

(51) Int. Cl.
*H04L 1/00* (2006.01)
*H04L 5/00* (2006.01)

(52) U.S. Cl.
CPC ............ *H04L 1/003* (2013.01); *H04L 1/0073* (2013.01); *H04L 5/0055* (2013.01); *H04L 1/0061* (2013.01)

(58) Field of Classification Search
CPC ..... H04L 1/003; H04L 1/0073; H04L 5/0055; H04L 1/0061; H04L 1/0031; H04L 5/0057
See application file for complete search history.

(56) References Cited

U.S. PATENT DOCUMENTS 10,506,579 B2 * 12/2019 He ................... H04W 72/23
2010/0165931 A1 * 7/2010 Nimbalker ........... H04L 5/0053
370/329

(Continued)

FOREIGN PATENT DOCUMENTS

CN 103493391 A 1/2014
CN 107409014 A 11/2017

(Continued)

OTHER PUBLICATIONS

International Search Report and Written Opinion dated Jun. 6, 2018 for International Application No. PCT/SE2018/050029 filed on Jan. 12, 2018, consisting of 9-pages.

(Continued)

*Primary Examiner* — Hoang-Chuong Q Vu
(74) *Attorney, Agent, or Firm* — Weisberg I.P. Law, P.A.

(57) ABSTRACT

There is disclosed a method of operating a feedback radio node in a radio access network. The feedback radio node being is configured with a plurality of sets of transmission resources for transmission of control information. Different of the sets are associated with different size classes of control information and/or different transmission formats for control information to be transmitted. The method includes transmitting control information having a number A of bits of acknowledgement information, and a number M of bits of measurement information, wherein the control information is transmitted on a resource of one of the sets based on a reference size for the measurement information. The disclosure also pertains to related methods and devices.

17 Claims, 2 Drawing Sheets

(56) References Cited

U.S. PATENT DOCUMENTS

| | | | |
|---|---|---|---|
| 2014/0301324 A1* | 10/2014 | Cheng | H04L 5/0055 370/329 |
| 2015/0173066 A1* | 6/2015 | Gao | H04L 1/0031 370/329 |
| 2017/0041103 A1* | 2/2017 | Määttanen | H04B 7/0626 |
| 2017/0188352 A1* | 6/2017 | Lee | H04L 5/0053 |
| 2018/0006791 A1 | 1/2018 | Marinier et al. | |
| 2018/0110041 A1* | 4/2018 | Bendlin | H04W 72/044 |
| 2018/0160423 A1* | 6/2018 | Yan | H04L 5/0057 |
| 2019/0028256 A1* | 1/2019 | Yang | H04L 5/0048 |
| 2019/0037586 A1* | 1/2019 | Park | H04L 1/0031 |
| 2019/0081763 A1* | 3/2019 | Akkarakaran | H04L 1/1607 |
| 2019/0141677 A1* | 5/2019 | Harrison | H04L 5/0096 |
| 2019/0174479 A1* | 6/2019 | Yamazaki | H04L 5/0057 |
| 2020/0076547 A1* | 3/2020 | Wang | H04L 5/0055 |
| 2020/0214024 A1* | 7/2020 | Lee | H04B 7/0626 |
| 2020/0295865 A1* | 9/2020 | Yang | H04L 1/0007 |
| 2020/0296715 A1* | 9/2020 | Wang | H04W 72/23 |
| 2020/0367244 A1* | 11/2020 | Yang | H04W 72/02 |
| 2021/0160830 A1* | 5/2021 | He | H04L 5/001 |

FOREIGN PATENT DOCUMENTS

| | | |
|---|---|---|
| WO | 2011082827 A1 | 7/2011 |
| WO | 2017142676 A1 | 8/2017 |

OTHER PUBLICATIONS

European Search Report dated Oct. 17, 2022 for Application 18 701 818.9, consisting of 8 pages.
3GPP TSG RAN WG1 Meeting #70 R1-123203; Title: Periodic CSI and HARQ-ACK multiplexing with PUCCH format 3 configured in Rel-11; Source: CATT; Agenda Item: 7.2.1.2.1; Document for: Discussion and Decision; Location and Date: Qingdao, China, Aug. 13-17, 2012, consisting of 6 pages.
Chinese Office Action and English Summary dated Dec. 1, 2022 for Application No. 201880086298.9, consisting of 10 pages.
3GPP TSG RAN WG1 Meeting 90bis R1-1718638; Title: On UCI on PUSCH; Agenda Item: 7.3.2.3; Source: Ericsson; Document for: Discussion, Decision; Location and Date: Prague, CZ, Oct. 9-13, 2017, consisting of 6 pages.

* cited by examiner ics, and a number M of bits of measurement information. The control information is received on a reception resource, the reception resource being associated to a resource of one of the set of resources on which the control information is transmitted based on a reference size for the measurement information. The method may comprise communicating with the feedback radio node based on the received control information.

CONTROL SIGNALING FOR RADIO ACCESS NETWORKS

CROSS-REFERENCE TO RELATED APPLICATIONS

This application is a Submission Under 35 U.S.C. § 371 for U.S. National Stage Patent Application of International Application Number: PCT/SE2018/050029, filed Jan. 12, 2018 entitled "CONTROL SIGNALING FOR RADIO ACCESS NETWORKS," the entirety of which is incorporated herein by reference.

TECHNICAL FIELD

This disclosure pertains to wireless or telecommunication communication technology, in particular to radio access technology, e.g. for mobile communication.

BACKGROUND

Currently, radio telecommunication technology of $5^{th}$ Generation is being developed, with the goal to serve a large variety of use cases. Accordingly, the related systems have to be very flexible, and new kinds of signaling and information may be required to be transmitted. However, flexibility in many cases incurs signaling overhead, which should be avoided or limited for good performance.

This is particularly relevant for acknowledgement signaling processes, which are used to ensure correct reception of transmitted data and thus are run in parallel to many transmissions.

SUMMARY

It is an object of this disclosure to provide approaches allowing flexible control signaling without incurring undesirably large signaling overhead, in particular in the context of transmission of measurement information with adaptive size. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution. It should be noted that in the following, the terms data (sub)structure and data block (sub)structure may be considered to be used synonymously.

There is disclosed a method of operating a feedback radio node like a user equipment in a radio access network. The feedback radio node is being configured with a plurality of sets of transmission resources for transmission of control information, wherein different of the sets are associated with different size classes of control information and/or different transmission formats for control information to be transmitted. The method comprises transmitting control information comprising a number A of bits of acknowledgement information, and a number M of bits of measurement information, wherein the control information is transmitted on a resource of one of the sets based on a reference size for the measurement information. The method may comprise determining the set of resources based on the reference size.

Moreover, there is described a feedback radio node for a radio access network. The feedback radio node is adapted for being configured or configurable with a plurality of sets of transmission resources for transmission of control information, wherein different of the sets are associated with different size classes and/or different transmission formats for control information to be transmitted. The feedback radio node also is adapted for transmitting control information comprising number A of bits of acknowledgement information, and a number M of bits of measurement information, wherein the control information is transmitted on a resource of one of the sets based on a reference size for the measurement information. The feedback radio node may comprise, and/or be adapted for utilising, processing circuitry and/or radio circuitry, in particular a transmitter and/or receiver and/or transceiver, for transmitting the control information and/or being configured and/or determining the set of resources comprising the resource used for transmission, e.g. based on the reference size.

Also, there is disclosed a method of operating a signaling radio node or a network node arrangement in a radio access network, the method comprising receiving control information from a feedback radio node. The feedback radio node is configured, e.g., by the signaling radio node or network node arrangement, with a plurality of sets of resources for transmission of control information, wherein different of the sets are associated with different size classes and/or different transmission formats for control information to be transmitted. The transmitted control information comprises a number A of bits of acknowledgement information, and a number M of bits of measurement information. The control information is received on a reception resource, the reception resource being associated to a resource of one of the set of resources on which the control information is transmitted based on a reference size for the measurement information. The method may comprise communicating with the feedback radio node based on the received control information.

A signaling radio node or a network node arrangement for a radio access network may be considered. The signaling radio node or the network node arrangement may be adapted for receiving control information from a feedback radio node, the control information comprising a number A of bits of acknowledgement information, and a number M of bits of measurement information, wherein the feedback radio node is configured, e.g. by the signaling radio node or the arrangement, with a plurality of sets of resources for transmission of control information, wherein different of the sets are associated with different size classes and/or different transmission formats for control information. The signaling radio node or network node arrangement is adapted for receiving the control information on a reception resource, the reception resource being associated to a resource of one of the set of resources on which the control information is transmitted based on a reference size for the measurement information. It may be considered that the signaling radio node or the network node arrangement is adapted for communicating with the feedback radio node based on the received control information. The signaling radio node or the network node arrangement may comprise, and/or be adapted for utilising, processing circuitry and/or radio circuitry, in particular a transmitter and/or receiver and/or transceiver, for receiving and/or configuring and/or communicating and/or determining the set of resources.

Generally, alternatively, or additionally to the set of resources, the format used for transmitting the control information may be considered to be based on the reference size, e.g. determined based thereon, which may be based on the association of sets of resources and formats.

The measurement information may comprise channel state information, and/or may be determined based on measurements, which may be performed on reference signals or data signaling from the network, e.g. the signaling radio node and/or node arrangement. Measurement information may generally be determined based on a measurement configuration, which may be configured to the feedback radio node, e.g. semi-statically and/or with RRC signaling, and/or with physical layer signaling or other signaling. Measurement information like channel state information (specifically, CSI), may comprise CQI and/or PMI and/or RI and/or beamforming information. It may generally be considered that measurement information comprises two components, one of which may be with fixed size (e.g., based on a configuration or predefined), and one which may have variable or adaptive size, e.g. based on measurement results and/or resolution. Examples of such components may be referred to as CSI part 1 for the fixed size component, and CSI part 2 for the other component. Measurement information may comprise one or more of such component or information pairings, which may be associated to different measurements and/or carriers and/or processes and/or signals. The first component may comprise a size indicator or size indication indicating the size of the second component. Thus, a receiver like a signaling radio node or network node arrangement may need to decode the first component, to determine the size indicator, before it decodes the second component based on the size indicator. The variable or adaptive size may differ from transmission occasion to occasion, and in particular may not be predictable or configurable.

In some variants, the measurement information may comprise one or more information pairings, each information pairing comprising a first component and a second component, wherein the second component of each information pairing may have an adaptive size. Alternatively, or additionally, the measurement information may comprise one or more information pairings, each information pairing comprising a first component and a second component, wherein the first component of each information pairing comprises a size indication indicating a size of the second component. Different second components may have different sizes, which may vary differently.

For measurement information having one or more components with variable or adaptive size, the total size of information to be transmitted may be unpredictable and fluctuate significantly. This may in particular lead to different sets of resources being used for different transmission, and the receiver not knowing which set to monitor for the control information. This is inefficient, as it costs resources, in particular, as it may incur numerous blind detection processes.

It may generally be considered that the set of resources is based on the reference size, in particular determined based on the reference size. Generally, the size of information may be represented by the number of bits representing the information. The reference size may be a bit size indicating a size of the measurement information, in particular of the variable part and/or representing the variable or adaptive part. Optionally, in some cases, the fixed part and/or the size of the acknowledgment information may be represented also. A reference size may be associated to each variable component, e.g. representing an average value or maximum value for a variable component or another representative value, and/or may represent the sum of variable size components, and optionally of fixed size components and/or the acknowledgment information (number A). It should be noted that the size indicator may contribute to the fixed size of a component.

By considering the reference size a reliable and/or predictable size and/or size class may be determined, such that transmitter and receiver may independently be enabled to determine a set of resources and/or formats to transmit and/or monitor for reception. Thus, the set of resources may be considered to be based on, or be determined by, the reference size. The actual resource used for transmitting may be selected by an indicator in control signaling, e.g. DCI or SCI signaling, for example an ARI or UCI indicator. Hence, the resource may be known for transmitter and receiver as well. It should be noted that the reference size may represent a size estimate used for selection of the set of resources and/or the associated format; it may be considered that the reference size selects the sets of resources and/or the format.

It may be considered that the number M of bits of the measurement information is based on the format or size range associated to the set of transmission resources of the resource the control information is transmitted on. M may additionally be dependent on the number A of acknowledgement information bits. The sum of A+M may at maximum be as large as the format and/or resource used for transmission may carry, e.g. based on a used modulation and coding scheme. If the allowed size, which is dependent on an estimate represented by the reference size, not the real value, is not large enough to carry all information bits, bits of measurement information may be dropped. In particular, variable size components may be dropped, e.g. according to size, and if the size is still larger than the allowed size, fixed size components may be dropped as well. As basing the set of resources and/or formats (which may be different message formats, e.g. PUCCH or PSCCH formats) on the reference size may consider the number A, the size should allow carrying the acknowledgement information. Accordingly, the structure of the control information may be variable. It may be assumed that both transmitter and receiver know the same rules for reducing M (e.g., due to the network configuring the feedback radio node accordingly, e.g. with signaling from the signaling radio node or the node arrangement).

There is also considered a program product comprising instructions adapted for causing processing circuitry to control and/or perform a method as described herein. Also, a carrier medium arrangement carrying and/or storing a program product as described herein is proposed.

In general, for a UE or feedback radio node, different sets of resources may be configured for control information and/or transmission on a physical control channel like PUCCH or PSCCH. The sets may be configured with control signaling, in particular RRC layer signaling and/or semi-statically, e.g. by a signaling radio node or node arrangement. Each set may comprise one or more resources. Different sets may comprise different numbers of resources, or the same. A resource may be an indicatable resource, and/or may be pointed to an indicator, which may be transmitted in control signaling to be received by the feedback radio node. Such an indicator may for example be an ARI or UCI pointer or other indicator. The (maximum) number of resources in a set (indicatable resources) may correspond to the number of resources indicatable with such an indicator, e.g. based in its size in bits. For example, the number may be a multiple or power of 2, e.g. 2 or 4. Each set may be associated to a control information size class and/or an associated format. The size class may for example indicate a payload size for the control information, or a part thereof, e.g. acknowledgement information, and/or a range of sizes. One or more of the size classes and/or ranges may be configurable, e.g. semi-statically or with RRC signaling.

The set of resources to be used for the transmission may be based on the size class of the control information, e.g. as determined. The size class of control information may be based on the reference size and may be based on the number of bits A of the acknowledgment information to be transmitted. The number A may be configured, e.g. by the network, in particular the signaling radio node and/or node arrangement, and/or depend on the codebook used.

Determining control information may comprise and/or be based on measurements and/or decoding and/or demodulation and/or error detection, e.g. according to the type of control information. Receiving control information may comprise decoding and/or demodulating and/or interpreting received signaling based on the assumption it has a format or structure or content, e.g. based on A and M. It may be considered that receiving control information comprises signaling received at specific resources with specific information and/or messages and/or specific transmission sources, e.g. feedback radio nodes. Generally, a reception resource may be related to a transmission resource based on a signaling delay between the transmitter and the receiver.

A transmission resource may be a time and/or frequency resource, e.g. a resource element or a group of resource elements. A resource may extend in time over one or more symbols, e.g. within a slot or in some cases, across one or more slot boundaries. It may be considered that a resource extends in time over one or more subcarriers, and/or one or more physical resource blocks. In some cases, a resource may be equal or shorter in time domain than a slot duration (which may be 14 symbols, or another value, e.g. a value below 20 symbols). A resource may be configured for, and/or be associated to, a channel, e.g. a control channel, which may be a physical channel, e.g. a PUCCH or PSCCH, and/or for a specific type of control information or signaling. One or more specific transmission message formats may be associated to a resource. Such a format may for example specify payload size and/or size range, and/or structure, and/or modulation and coding, and/or repetition rate and/or code rate and/or duration of transmission, e.g. of a message. A resource may be larger (in time and/or frequency) than necessary to carry associated and/or configured control information.

A set of resources, and/or the sets of resources, may be configured with one or more messages, e.g. semi-statically and/or with RRC signaling, and/or dynamically, e.g. with physical layer signaling, like DCI or SCI signaling. It may be considered that a set of resources is configured with semi-static and/or RRC layer signaling, and one of the resources is indicated (configured) with dynamic and/or physical layer signaling. This may particularly be performed for resource/s associated to, and/or configured for, acknowledgement information. Generally, it may be considered that the network, e.g. a signaling radio node and/or node arrangement, configures a feedback radio node, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

Acknowledgement information may pertain to one or more acknowledgement signaling processes, e.g. HARQ processes or ARQ processes. Measurement information may be represented by channel state information (e.g., CSI), e.g. channel quality information (e.g., CQI) and/or rank information (e.g., RI) and/or precoding information (e.g., PMI), and/or beamforming information (which in some cases may be considered a type of its own). The number of bits A of acknowledgment information may be configured or configurable, e.g. based on a HARQ configuration or codebook, which may be configured via RRC layer signaling and/or semi-statically, and/or dynamically, e.g. with one or more counters like a Downlink Assignment Indicator (DAI) or Uplink grant counter or total DAI.

Control information on one resource may be considered to be transmitted in a message having a specific format. A message may comprise or represent bits representing payload information (in particular, the control information, which may be of one or of both the first and second type) and coding bits, e.g. for error coding.

Receiving control information may comprise receiving one or more control information messages. It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

Acknowledgement information or feedback signaling carrying it may pertain to signaling scheduled by control signaling, and/or to the control signaling itself, in particular if it is of command type. The feedback signaling may pertain to a plurality of subject transmission, which may be on different channels and/or carriers, and/or may comprise data signaling and/or control signaling. The feedback signaling may be based on a codebook, which may be based on one or more size indications and/or assignment indications, which may be received with a plurality of control signalings and/or control messages, e.g. in the same or different transmission timing structures, and/or in the same or different (target) sets of resources. Transmitting feedback signaling may comprise determining the codebook, e.g. based on control information in one or more control information messages. A codebook may pertain to feedback signaling at a single and/or specific instant, e.g. a single PUCCH or PUSCH transmission, and/or in one message or with jointly encoded and/or modulated feedback information.

It may be considered that control signaling (e.g., DCI or SCI) may comprise information indicating the triggering of feedback signaling. Triggering feedback signaling may comprise indicating that feedback signaling should be transmitted, and/or indicating one or more resources and/or timing for feedback signaling, and/or indicating subject signaling or subject transmission to which the feedback signaling may pertain.

Control information may be considered to have a control information structure, which may be represented by the bit pattern. It may be considered that a control information structure like a bit pattern may indicate a size and/or content of control information, in particular the size of a bit pattern representing the control information. A control information structure may indicate the content and/or arrangement of bits in of the control information. In particular it may indicate a mapping of bits or subpatterns of bits of a bit pattern representing the control information to information and/or fields, and/or may indicate the function or meaning of bits or subpatterns.

Generally, the control information may be included in a control information message, which may be carried by the control signaling.

A feedback radio node may in particular be a user equipment or terminal. However, in some scenarios, e.g. backhaul or relay scenarios, a feedback radio node may be a network node, in particular a base station and/or gNodeB.

A signaling radio node may for example be a network node. However, in some scenarios, e.g. sidelink scenarios, the signaling radio node may be a user equipment or terminal. A signaling radio node arrangement, also referred to as network node arrangement, may comprise one or more radio nodes, in particular network nodes, which may be of the same or different types. Different nodes of the arrangement may be adapted for, and/or provide, different functionalities described herein. In particular, different nodes may configure different codebooks, and/or different nodes may perform configuring and perceiving. A signaling radio node arrangement may in some variants represent a radio access network, and/or a heterogenous network (HetNet), and/or provide dual (or multiple) connectivity, e.g. comprising an anchor node and a booster node, and/or one or more of each or either. The radio nodes of a node arrangement may comprise suitable interfaces for communication between them, e.g. communication interfaces and/or corresponding circuitry.

Control information and/or control signaling carrying it or associated to it may be represented by control information message, in particular a physical layer message and/or DCI message and/or SCI message. A control information message may also be referred to as control message. In uplink, the message may be a UCI message and/or a message on a PUCCH resource. Generally, the set of resources may comprise resources for PUCCH transmission, or for PSCCH transmission, or for another channel, or dedicated to control information as described herein, which may comprise acknowledgement information, and, depending on A, M and the format, measurement information.

Control information transmitted by a feedback radio node, e.g. as feedback signaling, may be transmitted on resources, which may be scheduled and/or indicated and/or configured, e.g. in one or more resource pools or sets, one of which may be selected or selectable with control information. Configuring the resources may be performed by a signaling radio node or arrangement, e.g. with higher-layer signaling like RRC and/or MAC signaling. The resources may be associated to a specific channel. Different resources or pools may be associated to different channels. Examples of such channels are PUSCH or PUCCH or PSCCH or PSSCH, or a URLLC channel in uplink or sidelink. The resources and/or sets of resources may pertain to slot-based or non-slot based (mini-slot) transmissions. Different resources and/or sets of resources may pertain to different transmission timing structures and/or timing types (slot-based or non-slot based).

An assignment indication like an acknowledgment resource indication (ARI) may indicate one or more resource pools, which may be configured, and/or a resource or set or resources within a resource pool, for example depending on its resolution and/or number of bits. An assignment indication may in general be transmitted in control signaling, e.g. DCI and/or SCI, in particular a scheduling assignment.

Generally, a codebook may be selected based on resources scheduled for transmission of the feedback signaling, e.g. in a resource structure and/or resource pool and/or region or set. The resources may be associated to a channel, in particular a physical and/or control channel, for example PUCCH or PSCCH. The resources may be scheduled with control signaling, e.g. a control message like a DCI or SCI message, which may in some variants implicitly or explicitly indicate the association to a channel and/or transmission format. Scheduling the resources may be considered an example of configuring. Scheduling resources may comprise indication resources from a set of resources, which may be configured and/or configurable, in particular with higher layer control signaling, like RRC signaling and/or MAC signaling.

Independent, or in combination with other criteria, it may be considered that the codebook is selected based on subject transmission characteristics, e.g. resources used for the subject transmission, and/or channel, and/or number of layers, e.g. in MIMO scenarios, and/or transport block size, and/or retransmission status (e.g., number of retransmission of the current transport block or code block group).

In general, the codebook may be selected based on a format indicated for the feedback signaling, e.g. a transmission format. The transmission format may be indicated implicitly or explicitly. For example, a transmission format may be associated to a channel and/or resources, which may be indicated by a mapping. The mapping may in some variants be configured or configurable, e.g. with higher layer control signaling like RRC and/or MAC signaling, and/or be predefined. The transmission format may be indicated, e.g. configured and/or scheduled, with control signaling, in particular a control message, which may be physical layer signaling, and/or a DCI or SCI message. A transmission format may for example define a structure of a message comprising and/or carrying the feedback information, e.g. in terms of header information and/or additional information and/or MCS and/or duration and/or maximum number of bits, etc. In general, a transmission format may pertain to a specific channel, e.g. a physical and/or control channel like PUCCH or PSCCH. A transmission format in some examples may represent short or long transmission, e.g. short or long PUCCH or PSCCH, and/or a transmission of 2 bits or less, or larger than 2 bits.

In general, a subpattern of bits of the feedback information may pertain to control signaling or data signaling (as examples of subject transmissions), and/or an associated message and/or data structure or substructure, in particular a control message or transport block or code block group.

Different feedback codebooks may pertain to different carriers and/or different carrier arrangements and/or different types of signaling and/or different types of control signaling and/or different types of data signaling. A type may be related to the message type, and/or channel and/or format and/or resources associated to the signaling. A control message type may be distinguished between fixed-size message (which may for example be fallback control messages) and messages with configurable size. The size may be measured in bits and/or modulation symbols.

Feedback signaling, in particular acknowledgement signaling and/or acknowledgement information, may generally pertain to subject transmission. Subject transmission may be data signaling or control signaling. The transmission may be on a shared or dedicated channel. Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. In some cases, the subject transmission may comprise, or represent, reference signaling. For example, it may comprise DM-RS and/or pilot signaling and/or discovery signaling and/or sounding signaling and/or phase tracking signaling and/or cell-specific reference signaling and/or user-specific signaling, in particular CSI-RS. Feedback based on reference signaling may comprise measurement information, e.g. CQI/CSI information and/or related information, which may be determined based on subject transmission comprising and/or representing reference signaling. A subject transmission may pertain to one scheduling assignment and/or one acknowledgement signaling process (e.g., according to identifier or subidentifier), and/or one subpattern of feedback signaling.

It may be considered that transmitting the feedback signaling, in particular of acknowledgement information, is based on determining whether the subject transmission/s has or have been received correctly, e.g. based on error coding and/or reception quality. Reception quality may for example be based on a determined signal quality.

A system comprising a plurality of radio nodes as described herein, in particular a network node and one or more user equipments, may be considered.

Acknowledgement or feedback information may represent and/or comprise one or more bits, in particular a pattern of bits. Multiple bits pertaining to a data structure or substructure or message like a control message may be considered a subpattern. The structure or arrangement of feedback or acknowledgement information may indicate the order, and/or meaning, and/or mapping, and/or pattern of bits (or subpatterns of bits) of the information. An acknowledgment configuration, in particular the feedback configuration, may indicate the size of, and/or arrangement and/or mapping of bits of, acknowledgement information carried by the acknowledgement signaling the configuration pertains to. Such a configuration may be referred to as codebook and may be associated to a first transmission resource or a set of resources. The structure or mapping may in particular indicate one or more data block structures, e.g. code blocks and/or code block groups and/or transport blocks and/or messages, e.g. command messages, the acknowledgement information pertains to, and/or which bits or subpattern of bits are associated to which data block structure. In some cases, the mapping may pertain to one or more acknowledgement signaling processes, e.g. processes with different identifiers, and/or one or more different data streams. The configuration may indicate to which process/es and/or data stream/s the information pertains. Generally, the acknowledgement information may comprise one or more subpatterns, each of which may pertain to a data block structure, e.g. a code block or code block group or transport block. A subpattern may be arranged to indicate acknowledgement or non-acknowledgement, or another retransmission state like non-scheduling or non-reception, of the associated data block structure. It may be considered that a subpattern comprises one bit, or in some cases more than one bit. It should be noted that acknowledgement information may be subjected to significant processing before being transmitted with acknowledgement signaling. Different configurations may indicate different sizes and/or mapping and/or structures and/or pattern.

An acknowledgment signaling process (providing acknowledgment information) may be a HARQ process, and/or be identified by a process identifier, e.g. a HARQ process identifier or subidentifier. Acknowledgement signaling and/or associated acknowledgement information may be referred to as feedback or acknowledgement feedback. It should be noted that data blocks or structures to which subpatterns may pertain may be intended to carry data (e.g., information and/or systemic and/or coding bits). However, depending on transmission conditions, such data may be received or not received (or not received correctly), which may be indicated correspondingly in the feedback. In some cases, a subpattern of acknowledgement signaling may comprise padding bits, e.g. if the acknowledgement information for a data block requires fewer bits than indicated as size of the subpattern. Such may for example happen if the size is indicated by a unit size larger than required for the feedback.

Acknowledgment information may generally indicate at least ACK or NACK, e.g. pertaining to an acknowledgment signaling process, or an element of a data block structure like a data block, subblock group or subblock, or a message, in particular a control message. Generally, to an acknowledgment signaling process there may be associated one specific subpattern and/or a data block structure, for which acknowledgment information may be provided.

An acknowledgment signaling process may determine correct or incorrect reception, and/or corresponding acknowledgement information, of a data block like a transport block, and/or substructures thereof, based on coding bits associated to the data block, and/or based on coding bits associated to one or more data block and/or subblocks and/or subblock group/s. Acknowledgement information (determined by an acknowledgement signaling process) may pertain to the data block as a whole, and/or to one or more subblocks or subblock groups. A code block may be considered an example of a subblock, whereas a code block group may be considered an example of a subblock group. Accordingly, the associated subpattern may comprise one or more bits indicating reception status or feedback of the data block, and/or one or more bits indicating reception status or feedback of one or more subblocks or subblock groups. Each subpattern or bit of the subpattern may be associated and/or mapped to a specific data block or subblock or subblock group. In some variants, correct reception for a data block may be indicated if all subblocks or subblock groups are correctly identified. In such a case, the subpattern may represent acknowledgement information for the data block as a whole, reducing overhead in comparison to provide acknowledgement information for the subblocks or subblock groups. The smallest structure (e.g. subblock/subblock group/data block) the subpattern provides acknowledgement information for and/or is associated to may be considered its (highest) resolution. In some variants, a subpattern may provide acknowledgment information regarding several elements of a data block structure and/or at different resolution, e.g. to allow more specific error detection. For example, even if a subpattern indicates acknowledgment signaling pertaining to a data block as a whole, in some variants higher resolution (e.g., subblock or subblock group resolution) may be provided by the subpattern. A subpattern may generally comprise one or more bits indicating ACK/NACK for a data block, and/or one or more bits for indicating ACK/NACK for a subblock or subblock group, or for more than one subblock or subblock group.

A subblock and/or subblock group may comprise information bits (representing the data to be transmitted, e.g. user data and/or downlink/sidelink data or uplink data). It may be considered that a data block and/or subblock and/or subblock group also comprises error one or more error detection bits, which may pertain to, and/or be determined based on, the information bits (for a subblock group, the error detection bit/s may be determined based on the information bits and/or error detection bits and/or error correction bits of the subblock/s of the subblock group). A data block or substructure like subblock or subblock group may comprise error correction bits, which may in particular be determined based on the information bits and error detection bits of the block or substructure, e.g. utilising an error correction coding scheme, e.g. LDPC or polar coding. Generally, the error correction coding of a data block structure (and/or associated bits) may cover and/or pertain to information bits and error detection bits of the structure. A subblock group may represent a combination of one or more code blocks, respectively the corresponding bits. A data block may represent a code block or code block group, or a combination of more than one code block groups. A transport block may be split up in code blocks and/or code block groups, for example based on the bit size of the information bits of a higher layer data structure provided for error coding and/or size requirements or preferences for error coding, in particular error correction coding. Such a higher layer data structure is sometimes also referred to as transport block, which in this context represents information bits without the error coding bits described herein, although higher layer error handling information may be included, e.g. for an internet protocol like TCP. However, such error handling information represents information bits in the context of this disclosure, as the acknowledgement signaling procedures described treat it accordingly.

In some variants, a subblock like a code block may comprise error correction bits, which may be determined based on the information bit/s and/or error detection bit/s of the subblock. An error correction coding scheme may be used for determining the error correction bits, e.g. based on LDPC or polar coding or Reed-Mueller coding. In some cases, a subblock or code block may be considered to be defined as a block or pattern of bits comprising information bits, error detection bit/s determined based on the information bits, and error correction bit/s determined based on the information bits and/or error detection bit/s. It may be considered that in a subblock, e.g. code block, the information bits (and possibly the error correction bit/s) are protected and/or covered by the error correction scheme or corresponding error correction bit/s. A code block group may comprise one or more code blocks. In some variants, no additional error detection bits and/or error correction bits are applied, however, it may be considered to apply either or both. A transport block may comprise one or more code block groups. It may be considered that no additional error detection bits and/or error correction bits are applied to a transport block, however, it may be considered to apply either or both. In some specific variants, the code block group/s comprise no additional layers of error detection or correction coding, and the transport block may comprise only additional error detection coding bits, but no additional error correction coding. This may particularly be true if the transport block size is larger than the code block size and/or the maximum size for error correction coding. A subpattern of acknowledgement signaling (in particular indicating ACK or NACK) may pertain to a code block, e.g. indicating whether the code block has been correctly received. It may be considered that a subpattern pertains to a subgroup like a code block group or a data block like a transport block. In such cases, it may indicate ACK, if all subblocks or code blocks of the group or data/transport block are received correctly (e.g. based on a logical AND operation), and NACK or another state of non-correct reception if at least one subblock or code block has not been correctly received. It should be noted that a code block may be considered to be correctly received not only if it actually has been correctly received, but also if it can be correctly reconstructed based on soft-combining and/or the error correction coding.

A subpattern may pertain to one acknowledgement signaling process and/or one carrier like a component carrier and/or data block structure or data block. It may in particular be considered that one (e.g. specific and/or single) subpattern pertains, e.g. is mapped by the codebook, to one (e.g., specific and/or single) acknowledgement signaling process, e.g. a specific and/or single HARQ process. It may be considered that in the bit pattern, subpatterns are mapped to acknowledgement signaling processes and/or data blocks or data block structures on a one-to-one basis. In some variants, there may be multiple subpatterns (and/or associated acknowledgment signaling processes) associated to the same component carrier, e.g. if multiple data streams transmitted on the carrier are subject to acknowledgement signaling processes. A subpattern may comprise one or more bits, the number of which may be considered to represent its size or bit size. Different bit n-tupels (n being 1 or larger) of a subpattern may be associated to different elements of a data block structure (e.g., data block or subblock or subblock group), and/or represent different resolutions. There may be considered variants in which only one resolution is represented by a bit pattern, e.g. a data block. A bit n-tupel may represent acknowledgement information (also referred to a feedback), in particular ACK or NACK, and optionally, (if n>1), may represent DTX/DRX or other reception states. ACK/NACK may be represented by one bit, or by more than one bit, e.g. to improve disambiguity of bit sequences representing ACK or NACK, and/or to improve transmission reliability.

The acknowledgement information or feedback information may pertain to a plurality of different transmissions, which may be associated to and/or represented by data block structures, respectively the associated data blocks or data signaling. The data block structures, and/or the corresponding blocks and/or signaling, may be scheduled for simultaneous transmission, e.g. for the same transmission timing structure, in particular within the same slot or subframe, and/or on the same symbol/s. However, alternatives with scheduling for non-simultaneous transmission may be considered. For example, the acknowledgment information may pertain to data blocks scheduled for different transmission timing structures, e.g. different slots (or mini-slots, or slots and mini-slots) or similar, which may correspondingly be received (or not or wrongly received). Scheduling signaling may generally comprise indicating resources, e.g. time and/or frequency resources, for example for receiving or transmitting the scheduled signaling.

A radio node, in particular a signaling radio node, and/or a corresponding arrangement, may generally be adapted for scheduling data blocks or subject transmission for transmission. Configuring a feedback radio node or an UE may comprise such scheduling and/or associated determining and/or configuring. The signaling radio node, and/or a corresponding arrangement, may be adapted for, and/or perform, transmitting of subject transmission.

Signaling may be considered to carry a message and/or information, if the message and/or information is represented in the (modulated) waveform of the signaling. In particular, extraction of a message and/or information may require demodulation and/or decoding of the signaling. Information may be considered to be included in a message if the message comprises a value and/or parameter and/or bit field and/or indication or indicator representing the information, or more than one or a combination thereof. Information included in such a message may be considered to be carried by the signaling carrying the message, and vice versa.

Transmitting acknowledgment information/feedback and/or associated signaling on resources may comprise multiplexing acknowledgement information and data/data signaling on the transmission resources, e.g., for UCI on PUSCH scenarios. In general, transmitting acknowledgement information and/or feedback may comprise mapping the information to the transmission resources and/or modulation symbol/s, e.g. based on a modulation and coding scheme and/or transmission format. The acknowledgement information may be punctured or rate-matched. Acknowledgement information pertaining to different subject transmissions and/or acknowledgment signaling processes may be mapped differently. For example, acknowledgement information pertaining to late subject transmissions and/or having a size smaller than a threshold size (e.g., 3 or 2 bits) may be punctured, whereas acknowledgment information pertaining to earlier (non-late) subject transmissions and/or having a size equal to or larger than the threshold size may be rate-matched.

Feedback signaling, e.g. acknowledgement feedback, may generally be transmitted on resources and/or on a channel and/or according to a transmission format according to one or more configurations, which may for example be selectable based on one or more indications of control information, e.g. of the control message carrying the control information in DCI or SCI.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
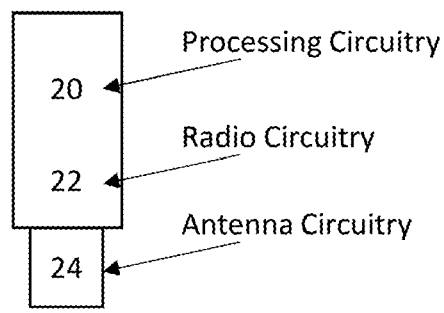
FIG. 1, showing an exemplary radio node implemented as a user equipment.

In the following, approaches are described for illustrative purposes in the context of NR RAT. However, they are generally applicable with other technologies. Also, communication in uplink and downlink between a signaling radio node like a network node and a feedback radio node like an UE is described by way of example. The approaches should not be construed to be limited to such communication, but can also be applied for sidelink or backhaul or relay communication. For ease of reference, in some cases it is referred to a channel to represent signaling or transmission on the channel. A PUSCH may represent uplink data signaling, a PDSCH downlink data signaling, a PDCCH downlink control signaling (in particular, one or more DCI messages like scheduling assignments or grants), a PUCCH uplink control signaling, in particular signaling of UCI. In some cases, UCI may be transmitted on PUSCH or associated resource instead of on PUCCH.

A carrier may be portioned into bandwidth parts (BWP). Bandwidth parts can have multiple usages. One of the envisioned usage scenarios is to enable multiple numerologies mixed in frequency-domain on the same carrier. A BWP configuration may indicate a set of frequency-domain resources, and an associate numerology. A UE can be configured with one or multiple BWP parts. DL and UL configurations (and/or SL configurations) may be are independent from each other. Typically, each BWP has its own associated CORESET for the scheduling DCI.

For NR, transmission of various control information from the UE to the network may be considered. Examples of such uplink control information (UCI) are hybrid-ARQ (HARQ) acknowledgements, channel-state information (CSI), and scheduling request (SR). The UCI can be transmitted on a separate control channel, PUCCH, occurring either at the end of the slot interval or during the slot interval, and/or be multiplexed with data and transmitted on PUSCH ("UCI on PUSCH").

There may be considered multiple formats defined for PUCCH that can be used to transmit control information as shown in the table below.

TABLE 1

Possible PUCCH format definitions

| PUCCH format | Number of symbols in a slot | Number of UCI bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH formats 0 and 2 are referred to as short PUCCH formats since they are transmitted only over 1 or two OFDM symbols in a slot. PUCCH formats 1, 3 and 4 are referred to as long PUCCH formats since they can be transmitted in up to 14 OFDM symbols (without slot aggregation) and even across multiple slots if PUCCH slot aggregation is configured. As shown in the table, each both long and short PUCCH formats are subdivided depending on the number of UCI bits they may contain.

A single slot may contain multiple transmissions of a single PUCCH format as well as multiple PUCCH formats which may or may not be transmitted by the same UE. For instance, a slot spanning 14 OFDM symbols may contain a long PUCCH spanning 12 OFDM symbols followed by a short PUCCH spanning two OFDM symbols.

Different PUCCH formats may be used for different purposes or represent different types of control information. The PUCCH formats that contain 2 bits or less can generally multiplex multiple UEs in the same time and frequency resources, with the long PUCCH being able to multiplex more users than the short PUCCH. PUCCH format 4 can multiplex multiple UEs with each UE having more than 2 bits.

In any given slot, the UE may have to transmit one or more of the following of control information, e.g. triggered by control signaling received from the network.

HARQ acknowledgements (HARQ-ACK), and/or

Channel state information (CSI), and/or

Scheduling Requests (SR)

CSI information may be scheduled to be transmitted periodically, e.g., once every N slots, or aperiodically, e.g. triggered by DCI. SR may be transmitted by the UE when the UE has some data to be sent. HARQ-ACK information is transmitted to acknowledge whether subject signaling like PDSCH transmissions (or control signaling) in the downlink were successfully received or not. HARQ-ACK may consist of subpatterns like a single bit to acknowledge an entire transport block or multiple bits, each representing a code block group (CBG), i.e., a set of code blocks among the code blocks that comprise a transport block.

The PUCCH resource to be used for each of the different types of UCI can generally be controlled by the gNB. This can be done via explicit resource assignments either through semi-static configuration (RRC signaling) or through dynamic signaling with an ACK/NACK resource indicator (ARI) sent in downlink control information (DCI) messages.

In addition, the UE can also determine PUCCH resources implicitly. For example, the PUCCH resource can be determined based on the number of UCI bits to be transmitted in a slot. PUCCH resources for HARQ-ACK transmission for a scheduled PDSCH may also be determined implicitly by the control channel element (CCE) at which the received control channel message (PDCCH) scheduling the PDSCH begins. Such implicit resource determination can reduce the overhead incurred for dynamic signaling and help to avoid collisions between the PUCCH resources determined by different UEs for transmission of UCI.

In general, (acknowledgement) feedback may be considered to pertain to information or signaling or a message if is determined based on evaluating error coding included into the information and/or calculated for the information, and/or if it is adapted to indicate a reception status of the information or signaling or message, e.g. acknowledgement or non-acknowledgement; and/or if it based on measurements performed on the signaling.

UL and DL scheduling may be performed using DL assignments and UL grants sent in DCI messages. To enable scheduling flexibility, format and physical resources of a DCI message on PDCCH may vary. For example, there are different DCI formats containing different control information fields, which may have different payload sizes.

The UE may monitor a set of downlink resources for possible DCI transmission and, if a valid DCI is detected (e.g. a downlink assignment or an uplink grant or command type message), it follows the content of the DCI. The monitoring is known as blind decoding, in which the UE is trying, for different combinations of DCI sizes and formats, to decode a PDCCH candidate possibly containing valid DCI.

A UE can be configured with different search spaces (sets of resources) at different aggregation levels and can also be configured to monitor different DCI payloads. A search space is either common or target specific, e.g. UE or ID-specific. A first search space type may be used for messages common to many users, such as messages related to initial access and/or paging, but can sometime also be used for UE specific signaling. In a UE specific search space, the majority of UE specific DCIs will be sent.

PUCCH can for example carry UCI, e.g. ACK/NACK (or more generally, feedback related to HARQ), measurement information like CQI/CSI, SR, or beam related information. NR defines a variety of different PUCCH formats, which can be grouped into short and long PUCCH formats.

A UE can be configured with multiple PUCCH formats or different control information types and/or with different associated transmission resources.

In NR, a carrier can support slot-based transmissions and non-slot-based transmissions (mini-slots). For slot-based transmissions, a UE might be configured with CBG. For non-slot-based transmission a CBG configuration might be less useful, especially if the transmissions are short (one or few code blocks). Also, if a UE is scheduled with fallback DCI, it may in some cases not use a CBG configuration. If a UE is scheduled with a non-slot-based transmission (e.g., to provide low latency), the gNB is likely to request early HARQ feedback to determine if a transmission has been successful. This can be done by indicating a different PUCCH resource than that one used for other ongoing transmissions. In such cases, a set of feedback configurations to select from may be advantageous.

In NR, a UE can be configured with multiple bandwidth parts. A HARQ codebook configuration can be associated with a bandwidth part, and depending on the bandwidth part of the transmission, a different HARQ codebook configuration may be used. Different bandwidth parts can be configured with different numerologies, i.e. also a numerology can be associated with a HARQ codebook configuration and depending which numerology is used for PDCCH and/or PDSCH a certain HARQ codebook configuration is selected. Several bandwidth parts/numerologies can point to the same HARQ codebook configuration.

NR supports multiple PUCCH/Cell groups. A PUCCH group is a set of DL component carriers together with an UL component carrier which is used for HARQ feedback of the DL carriers in the group. Different PUCCH groups can be associated with different HARQ codebook configurations, especially dynamic vs. semi-statically configured HARQ codebook.

NR may allow combined transmission of ACK/NACK (representing acknowledgement information), CSI Part1, and CSI Part 2 (representing a first and a second components of an information pairing of measurement information). CSI part 2 payload can vary, and the gNB/eNB (signaling radio node) may need to decode CSI Part 1 first to determine CSI Part 2 payload. An NR UE (feedback radio node) may be configured with multiple PUCCH resource sets. A first set for 1 to 2 bit payload, e.g. for ACK/NACK or UCI or more generally control information. A second set may be for 3 to $N_1$ bit payload, a third set for $N_1+1$ to $N_2$ payload, etc. Accordingly, different size classes may be defined, which are associated to different sets of resources. For different payloads or different sets, different format may be used. Generally, the number of sets may be configurable, for example to 3 or 4. An indicator like ARI (ACK/NACK resource pointer) or UCI resource pointer may select a resource within a set, whereas the set is selected based on the payload. The payload may be considered to represent the size of control information. It is proposed to use a reference size to replace the variable size(s), e.g. due to CSI part 2 components intended to be transmitted, allowing a predictable selection of set of resources and format. Since the gNB does not know the CSI Part 2 payload size (before decoding CSI Part 1), it does not know which PUCCH resource set the UE selects for transmission, such that the gNB may need to blindly detect PUCCH in resources in different sets.

It is proposed that for PUCCH resource set determination, the UE may assume for each of its intended CSI Part 2 reports a reference size, e.g. the maximum possible CSI Part 2 size (different CSI Part 2 reports may or may not have the same max size), or another reference size. For different parts, different reference sizes may be used. The reference sizes may be configured or configurable, or predetermined; it may be assumed that both UE and gNB are aware of the reference size/s. Alternatively, some defined function of min, max CSI Part2 sizes may be used to determine (virtual) payload that is used to determine PUCCH resource set; or a configured/specified reference CSI size may be used. Once the PUCCH resource set is determined, already agreed priority and dropping rules may be used if necessary. It should be noted that for transmitting the CSI Part 2 (comprising one or more Part 2s), the actual size is relevant, not the reference size, which is a max/virtual/configured size. If the largest PUCCH resource of a set is too small to carry the complete payload, the UE may drop, e.g. in a priority order, first CSI Part 2 components, e.g. according to size, and then may drop CSI Part1 components. Dropped components may not be transmitted with the control information, at least on the resource used for transmission of the not dropped parts, e.g. the acknowledgement information.

FIG. 1 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 2:
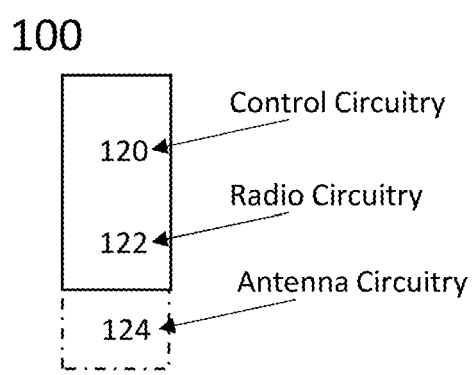
FIG. 2, showing an exemplary radio node implemented as a network node.

FIG. 2 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, and/or indicate quality of service and/or latency and/or data throughput and/or prioritisation, in particular they may indicate a capability to provide such, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or one or more data channel/s. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

Contention-based and/or grant-free transmission and/or access may be based on resource/s that are not specifically scheduled or reserved for the transmission or a specific device (or group of devices in some cases), and/or comprise transmission that is not unambiguously associatable, by the receiver, with a transmitter, e.g. based on the resources used for transmission.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A resource pool generally may indicate and/or comprise resources, in particular time-frequency resources, e.g. time and frequency intervals, which may be contiguous or interrupted, and/or code resources. A resource pool may in particular indicate and/or comprise resource elements and/or resource blocks, e.g. PRBs. A radio node like a user equipment may be considered to be configured with a resource pool if it received corresponding control signaling configuring it therewith. Such control signaling may in particular be transmitted by a receiving radio node as described herein. The control signaling may in particular be higher layer signaling, e.g. MAC and/or RRC signaling, and/or may be semi-static or semi-persistent. In some cases, the responding radio node or user equipment may be considered configured with a resource pool, if it is informed about a corresponding configuration, e.g. that it may access resources in the pool for transmitting. Such a configuration in some cases may be predefined, e.g. based on a standard and/or default configuration. A resource pool may be dedicated to one responding radio node or user equipment, or in some cases shared between several. It may be considered that a resource pool may be general, or for specific types of signaling, e.g. control signaling or data signaling. A transmission resource pool may in particular be for control signaling, e.g. uplink control signaling and/or sidelink control signaling, and/or may be dedicated to the user equipment/responding radio node. It may be considered that a resource pool comprises a plurality of resource structures, which may be arranged in subpools or groups, e.g. pertaining and/or according to type of (received or scheduled) signaling or type of response control signaling. Each group or subpool may comprise a number of resource structures, wherein the number may be representable by an indicator and/or bit field of the selection control information. For example, the maximum number of resource structures in a group may correspond to the maximum number of different values representable by the bit field or indicator. Different groups may have different numbers of resource structures. It may generally be considered that a group comprises a smaller number of resource structures than representable by the indicator or bit field. A resource pool may represent a search space and/or space of availability of resources and/or resource structures available for specific signaling. In particular, a transmission resource pool may be considered to represent a (time/frequency and/or code) domain or space of resources available for response control signaling.

A signaling characteristic may represent resources and/or resource structures in a reception resource pool, which may be different from the transmission resource pool. Resources and/or resource structures representing signaling characteristics of characterising signaling, in particular downlink (or sidelink) control signaling, and/or a corresponding reply, may in particular comprise one or more CORESETs (COntrol REsource SETs), each of which may represent a group or subpool. A CORESET may be associated to a specific time interval, in particular in a transmission timing structure like a slot, e.g. one or more symbols. It may be considered that a first CORESET is configured for the 1, 2, or 3 first symbols in a slot. A second CORESET may be configured for one or more later symbols, e.g. the 5th and/or 6th symbol of the same slot. In this case, the second CORESET may in particular correspond to mini-slot related signaling, e.g. comprise resource structures associated to short (e.g., 1 or 2 symbols) response control signaling, and/or a short latency requirement (e.g., 1 or 2 symbols), and/or received or scheduled transmission in a mini-slot and/or in response to a mini-slot, e.g. mini-slot data signaling. The first CORESET may be associated to slot-based signaling, e.g. long data signaling (e.g., longer than 2, 3 or 4 symbols), and/or response control signaling with relaxed latency requirement (e.g., more than 1 or 2 symbols, and/or allowing transmission in a later transmission timing structure like a later slot or subframe), and/or long response control signaling, e.g. longer than 2 or 3 or 4 symbols. Generally, different CORESETs may be separated in time domain by at least 1 symbol, in particular by 1, 2, 3 or 4 symbols. Depending in which of the groups or subpools, in particular CORESETs, characterising signaling is received, it may be associated to a specific subpool or group of the transmission resource pool. A reception resource pool may be predefined and/or configured to the responding radio node, e.g. by the receiving radio node, which may alternatively or additionally configure the transmission resource pool. Pool configuration may generally be predefined, or performed by the network or a network node (e.g., a receiving radio node), or another responding radio node taking the corresponding functionality and/or also operating as a receiving radio node, e.g. in sidelink communication (in which the configuration may be performed by another UE, or the network/network node).

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers. A resource pool or region or set may generally comprise one or a plurality (in particular, two or a multiple of two larger than two) of resources or resource structures. A resource or resource structure may comprise one or more resource elements (in particular, two or a multiple of two larger than two), or one or more PRBs or PRB groups (in particular, two or a multiple of two larger than two), which may be continuous in frequency. A Control CHannel Element (CCE) may be considered an example of a resource structure, in particular for control signaling, e.g. DCI or SCI.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically. In general, a configuration, in particular the feedback configuration and/or a codebook configuration or a set thereof, may be configured based on one or more messages. Such messages may be associated to different layers, and/or there may be at least one message for dynamical configuration and/or at least one message for semi-static configuration. Different messages may configure different or similar or the same parameter/s and/or setting/s; in some cases, dynamic configuration, e.g. with DCI/SCI signaling, may override semi-static configuration, and/or may indicate a selection from a set of configurations, which may e.g. be pre-defined and/or configured with higher layer/semi-static configuration. In particular, a configuration like a feedback configuration may be configured with one or more Radio Resource Control (RRC) messages and/or one or more Medium Access Control (MAC) messages and/or one or more Control Information messages, e.g. Downlink Control Information (DCI) messages and/or Sidelink Control Information (SCI) messages.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Transmitting feedback signaling may be based on, and/or comprise, determining feedback information, e.g. one or more bits representing the feedback information. Determining feedback information may comprise performing demodulation and/or error decoding and/or error detection and/or error correction, and/or determining one or more bits of acknowledgement information, e.g. pertaining to the subject transmission, and/or represented by an associated subpattern. Alternatively, or additionally, it may comprise performing measurement/s on the subject transmission, e.g. for demodulation, and/or for providing measurement information and/or for measurement reporting. In some cases, it may comprise determining a scheduling request, and/or providing scheduling-related information, e.g. regarding a buffer status. Transmitting feedback signaling may generally comprise, and/or be based on, determining feedback information, e.g. one or more feedback or ACK/NACK bits. Such determining may comprise performing error decoding, e.g. based on error coding bits, e.g. CRC and/or FEC bits associated to the subject transmission, e.g. data or control information, which may be included in the subject transmission. Error decoding may comprise correcting information, for example based on FEC bits. The error coding bits may be determined based on the information content bits, e.g. utilising an error coding scheme like CRC, and/or polar coding or LDPC coding or Reed Muller coding. The information content may be represented by bits. The information, and in some cases error coding bits associated thereto like error detection bits and/or error correction bits, like CRC and/or FEC bits, may be considered to represent one or more data structures or substructures, for each of which one or more feedback bits, e.g. to indicate ACK or NACK, may be included in the acknowledgement feedback. Thus, at least one bit may be provided for a data structure and/or the whole of the information and/or a message carrying it, and/or one bit may be provided for one or more substructures thereof, to which corresponding error coding may be associated and/or provided, e.g. in the message or signaling. A message may be considered to be similar to a transport block and/or a code block group. One or more acknowledgement process identifiers like a HARQ or ARQ identifier may be associated to the subject transmission. A bit subpattern representing reception (e.g., ACK/NACK or DTX/DRX) may be generally associated to the information in the acknowledgement feedback (acknowledgment feedback may refer to feedback information representing acknowledgement information).

Control information may generally be transmitted in a control message, e.g. on a physical layer or channel, e.g. as a dynamic message like a DCI message or SCI message. A control message may be a command type message, which may comprise, and/or consist of, command type information; or a scheduling type message, which may comprise scheduling information, e.g. scheduling data signaling. Control information may comprise scheduling type control information (or, shorter, scheduling type information), e.g. control information indicating resources and/or transmission parameters for reception of signaling, and/or control information indicating resources and/or transmission parameters for transmission of signaling. The signaling may in particular be data signaling, e.g. on a data channel. Control information may in particular comprise, or consist of, command type control information, and/or be included into a command type message. In general, control information or control message, e.g. DCI or SCI messages, may be distinguished between scheduling type information/messages and command type information/messages. A scheduling type message may schedule transmission on a data channel (data signaling), e.g. for reception or transmission for the target radio node, e.g. in downlink or uplink, respectively. Scheduling grant and scheduling assignment are examples of such scheduling type messages. A command type message may be a message of a different type, e.g., not scheduling transmission on a data channel. A command type message may comprise a set of instructions, which may be configurable or flexible. The instructions may be scheduling-independent. Command type information may for example indicate and/or instruct switching of bandwidth, e.g. to another bandwidth part, and/or activation or deactivation of a carrier and/or cell and/or bandwidth part, and/or activation or deactivation of grant-free transmissions, and/or indications of selection a parameter or configuration out of a set of configured parameters or configurations. In some variants, a command type message may be scheduling independent such that it does not schedule data signaling, or it may have a structure in which such scheduling may be configurable or optional. For the command type, there may be no scheduled transmission based on which reception of the control information may be inferred. It should be noted that scheduling type messages may comprise command type information. Feedback information may be considered a form of control information, in particular UCI or SCI, depending on communication direction or mode. Feedback signaling may be considered a form of control signaling. A control message comprising feedback information may be considered to be of a further type, which may be referred to as feedback type message, which may include a request for resources or in general UCI or UCI-like information in sidelink or backhaul or relay link.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement or substructure of a data element or data block like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Rate-matching may comprise including the rate-matched information into a bit-stream before encoding and/or modulating, e.g. replacing bits of data. Puncturing may comprise replacing modulated symbols with modulated symbols representing the punctured information.

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

Operational conditions may pertain to load of the RAN, or application or use case of transmission or signaling, and/or quality of service (QoS) conditions (or requirements) for a transmission or signaling. QoS may for example pertain to data rate and/or priority and/or latency and/or transmission quality, e.g. BLER or BER. Use for URLLC may be considered a quality of service-related condition.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or a general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
|---|---|
| ACK/NACK | Acknowledgment/Negative Acknowledgement |
| ARQ | Automatic Repeat reQuest |
| CAZAC | Constant Amplitude Zero Cross Correlation |
| CBG | Code Block Group |
| CCE | Control Channel Element |
| CDM | Code Division Multiplex |
| CM | Cubic Metric |
| CORESET | Control channel Resource Set |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DM(-)RS | Demodulation reference signal(ing) |
| FDD/FDM | Frequency Division Duplex/Multiplex |
| HARQ | Hybrid Automatic Repeat Request |

-continued

| Abbreviation | Explanation |
|---|---|
| IFFT | Inverse Fast Fourier Transform |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRACH | Physical Random Access CHannel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| QoS | Quality of Service |
| RB | Resource Block |
| RNTI | Radio Network Temporary Identifier |
| RRC | Radio Resource Control |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SVD | Singular-value decomposition |
| TDD/TDM | Time Division Duplex/Multiplex |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

The invention claimed is:

1. A method of operating a feedback radio node in a radio access network, the feedback radio node being configured with a plurality of sets of transmission resources for transmission of control information, different sets of the plurality of sets of transmission resources being associated with at least one of differently sized classes of control information and different transmission formats for control information to be transmitted, the method comprising:
   transmitting control information comprising a number A of bits of acknowledgement information, and a number M of bits of measurement information, the control information being transmitted on a transmission resource of one of the plurality of transmission resource sets based on a reference size for the measurement information; and
   the number M of bits of the measurement information being based at least in part on a range of sizes associated with the set of transmission resources to which the transmission resource on which the control information is transmitted belongs.

2. The method according to claim 1, wherein the measurement information comprises channel state information.

3. The method according to claim 1, wherein the measurement information comprises at least one information pairing, each information pairing comprising a first component and a second component, wherein the second component of each information pairing has an adaptive size.

4. The method according to claim 1, wherein the measurement information comprises at least one information pairing, each information pairing comprising a first component and a second component, wherein the first component of each information pairing comprises a size indication indicating a size of the second component.

5. The method according to claim 1, wherein the set of transmission resources is based on the reference size.

6. A feedback radio node for a radio access network, the feedback radio node comprising radio circuitry configured to:
　be one of configured and configurable with a plurality of sets of transmission resources for transmission of control information, different sets of the plurality of sets of transmission resources being associated with at least one of differently sized classes of control information and different transmission formats for control information to be transmitted; and
　transmit control information comprising number A of bits of acknowledgement information, and a number M of bits of measurement information, the control information being transmitted on a transmission resource of one of the plurality of transmission resource sets based on a reference size for the measurement information; and
　the number M of bits of the measurement information being based at least in part on a range of sizes associated with the set of transmission resources to which the transmission resource on which the control information is transmitted belongs.

7. The feedback radio node according to claim 6, wherein the measurement information comprises channel state information.

8. The feedback radio node according to claim 6, wherein the measurement information comprises at least one information pairing, each information pairing comprising a first component and a second component, wherein the second component of each information pairing has an adaptive size.

9. The feedback radio node according to claim 6, wherein the measurement information comprises at least one information pairing, each information pairing comprising a first component and a second component, wherein the first component of each information pairing comprises a size indication indicating a size of the second component.

10. The feedback radio node according to claim 6, wherein the set of transmission resources is based on the reference size.

11. A method of operating a signaling radio node in a radio access network, the method comprising:
　receiving control information from a feedback radio node, the feedback radio node being configured with a plurality of sets of transmission resources for transmission of control information, different sets of the plurality of sets of transmission resources being associated with at least one of differently sized classes of control information and different transmission formats for control information to be transmitted;
　the control information including a number A of bits of acknowledgement information, and a number M of bits of measurement information; and
　the control information being received on a reception resource, the reception resource being associated to a transmission resource of one of the plurality of transmission resource sets on which the control information is transmitted based on a reference size for the measurement information; and
　the number M of bits of the measurement information being based at least in part on a range of sizes associated with the set of transmission resources to which the transmission resource on which the control information is transmitted belongs.

12. The method according to claim 11, wherein the measurement information comprises channel state information.

13. The method according to claim 11, wherein the measurement information comprises at least one information pairing, each information pairing comprising a first component and a second component, wherein the second component of each information pairing has an adaptive size.

14. The method according to claim 11, wherein the measurement information comprises at least one information pairing, each information pairing comprising a first component and a second component, wherein the first component of each information pairing comprises a size indication indicating a size of the second component.

15. The method according to claim 11, wherein the set of transmission resources is based on the reference size.

16. A signaling radio node for a radio access network, the signaling radio node comprising radio circuitry configured to:
　receive control information from a feedback radio node, the control information comprising a number A of bits of acknowledgement information, and a number M of bits of measurement information, the feedback radio node being configured with a plurality of sets of resources for transmission of control information, different sets of the plurality of sets of transmission resources being associated with at least one of differently sized classes of control information and different transmission formats for control information;
　receive the control information on a reception resource, the reception resource being associated to a transmission resource of one of the plurality of transmission resource sets set of resources on which the control information is transmitted based on a reference size for the measurement information; and
　the number M of bits of the measurement information being based at least in part on one of a format and a range of sizes associated with the set of transmission resources to which the transmission resource on which the control information is transmitted belongs.

17. A non-transitory computer storage medium storing executable program instructions that when executed, cause processing circuitry to at least one of control and perform a method of operating a feedback radio node in a radio access network, the feedback radio node being configured with a plurality of sets of transmission resources for transmission of control information, different sets of the plurality of sets of transmission resources being associated with at least one of differently sized classes of control information and different transmission formats for control information to be transmitted, the method comprising:
　transmitting control information comprising a number A of bits of acknowledgement information, and a number M of bits of measurement information, the control information being transmitted on a transmission resource of one of the plurality of transmission resource sets based on a reference size for the measurement information; and
　the number M of bits of the measurement information being based at least in part on a range of sizes associated with the set of transmission resources to which the transmission resource on which the control information is transmitted belongs.

* * * * *